(12) United States Patent
Harris et al.

(10) Patent No.: US 7,099,291 B2
(45) Date of Patent: Aug. 29, 2006

(54) DISPATCH CALL ORIGINATION AND SET UP IN A CDMA MOBILE COMMUNICATION SYSTEM

(75) Inventors: John M. Harris, Chicago, IL (US); Ronald T. Crocker, St. Charles, IL (US); Lee M. Proctor, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 1072 days.

(21) Appl. No.: 09/887,172

(22) Filed: Jun. 22, 2001

(65) Prior Publication Data

US 2002/0197994 A1 Dec. 26, 2002

(51) Int. Cl.
*H04B 7/216* (2006.01)

(52) U.S. Cl. .................................... 370/335; 370/342

(58) Field of Classification Search ............... 370/335, 370/328, 329, 331, 332, 342, 395.2, 441, 370/252, 437, 389, 392
See application file for complete search history.

(56) References Cited

U.S. PATENT DOCUMENTS

| | | | | |
|---|---|---|---|---|
| 5,914,958 A * | 6/1999 | Chinitz et al. | ............... | 370/441 |
| 6,115,388 A | 9/2000 | Chinitz et al. | | |
| 6,304,558 B1 * | 10/2001 | Mysore | ..................... | 370/312 |
| 6,519,239 B1 * | 2/2003 | Panchal et al. | ............. | 370/335 |
| 6,654,608 B1 * | 11/2003 | Monell et al. | .............. | 455/436 |
| 6,862,273 B1 * | 3/2005 | Rozenstrauch et al. | ..... | 370/335 |
| 2001/0008523 A1 * | 7/2001 | Song | ......................... | 370/335 |
| 2001/0034233 A1 * | 10/2001 | Tiedemann et al. | ......... | 455/436 |
| 2002/0119792 A1 * | 8/2002 | Silvestri | ..................... | 455/463 |

* cited by examiner

Primary Examiner—Brian Nguyen
(74) Attorney, Agent, or Firm—Scott M. Garrett (57) ABSTRACT

In a CDMA wireless communication system (200) a dispatch call can be established between two CDMA mobile stations (202, 226), or between other mobile stations and the CDMA mobile station, or between a CDMA mobile station and a computer (236) located outside of the wireless system. To reduce the delay normally association with call set up in a CDMA system, a dispatch processing network (128, 144) is provided in addition to a telephony switch (118). Dispatch calls and call set up requests are routed to the dispatch processing network from the radio access network (110) which includes base stations (204, 206). Once a dispatch call request is made, while the dispatch processing network begins setting up a traffic channel for the originating mobile communication device, the target is also paged, and upon responding, set up on a traffic channel. The concurrence of establishing radio links with the target and originating communication devices substantially reduces dispatch call set up time.

15 Claims, 4 Drawing Sheets

DISPATCH CALL ORIGINATION AND SET UP IN A CDMA MOBILE COMMUNICATION SYSTEM

TECHNICAL FIELD

This invention relates in general to mobile communication systems, and more particular to mobile communication systems using a code division multiple access (CDMA) air interface for dispatch calls.

BACKGROUND OF THE INVENTION

Dispatch calling originally was used in fleet radio systems where a central dispatcher would communicate with remotely located mobile radios, such as in trucking operations, and public safety radio systems. Today this concept has evolved into a type of call between two or mote parties, and where the communication is essentially simplex or half-duplex in nature, and where the call is carried in part over a fixed equipment network. This type of calling has become very popular with small businesses and even between family members. An example of a present-day state of the art dispatch system is that operated by Nextel Communications, Inc. and which uses iDEN mobile phones and infrastructure equipment manufactured by Motorola, Inc. Indeed, the so-called "private call" feature of these systems have become a key marketing factor.

In general, the private call is a dispatch call between two parties. A first party knows the private identifier of the second party, and uses that to make a dispatch call to the second party. The advantage of a dispatch call is the speed with which the other party can be contacted, and the "caller speaks first" aspect of a dispatch call. That is, when the first party initiates a dispatch call to the second party, the communication system rapidly sets up the call, and sends a message to the first party's radio or mobile communication device. Upon receiving the message, the first party's radio generates an audible alert to let the first party know when to begin speaking. The second party's radio receives the voice signal and plays it for the second party to hear, with the second party having to take any action. The speed with which one party can communicate information to another party is significantly less compared to setting up a mobile telephone call between the tow radios.

Presently commercially available dispatch service is done with time division multiple access (TDMA) air interfaces. TDMA schemes assign each radio to a frequency and a specific time slot in a repeating time frame. While TDMA achieves higher capacity of traffic in a given frequency spectrum over systems that are merely frequency division multiple access (FDMA), code division multiple access (CDMA) systems permit even greater capacity. However, CDMA systems present a substantial problem in implementing dispatch calling.

In a CDMA system several mobile communication devices communicate on the same frequency at the same time, but use different pseudorandom codes to define different channels. CDMA systems achieve higher capacity through extensive management of each channel, and in particular managing the power at which the mobile communication device transmits so that other mobile communication devices will not have their signal overwhelmed or otherwise corrupted. However, power management in a CDMA air interface contributes significantly to the delay in setting up a call, and has been a prohibiting factor in designing a CDMA system that can set up calls rapidly, as is necessary to implement dispatch calling. Another source of delay in presently available CDMA systems is that standard telephony switching is used which requires a call to first be set up between the mobile communication device and the fixed equipment network, which then switches the call to the party being called who must answer the call before the calling party can speak. If the calling party is calling another CDMA service subscriber, then a link must be set up between the target party, and this is typically done after the link between the calling party has set up a link to the fixed equipment network. This delay results in an unacceptable amount of time being required for dispatch calling. Therefore there is a need for a method and a system which facilitates rapid call set up in a system using a CDMA air interface so that dispatch calling may be implemented.

DETAILED DESCRIPTION OF A PREFERRED EMBODIMENT

While the specification concludes with claims defining the features of the invention that are regarded as novel, it is believed that the invention will be better understood from a consideration of the following description in conjunction with the drawing figures, in which like reference numerals ate carried forward. A brief description of the prior art is also thought to be useful.

The invention substantially and significantly reduces the delay in setting up a call path normally associated with CDMA systems by concurrently setting up call links between the originating mobile station and the fixed equipment network and between the target and the fixed equipment network. Furthermore, to further reduce delay, the link established between the originating mobile station and the fixed equipment network can be implemented according to a protocol which uses retransmission such as a packet network session, instead of a tradition telephone circuit network session.

Figure 1:
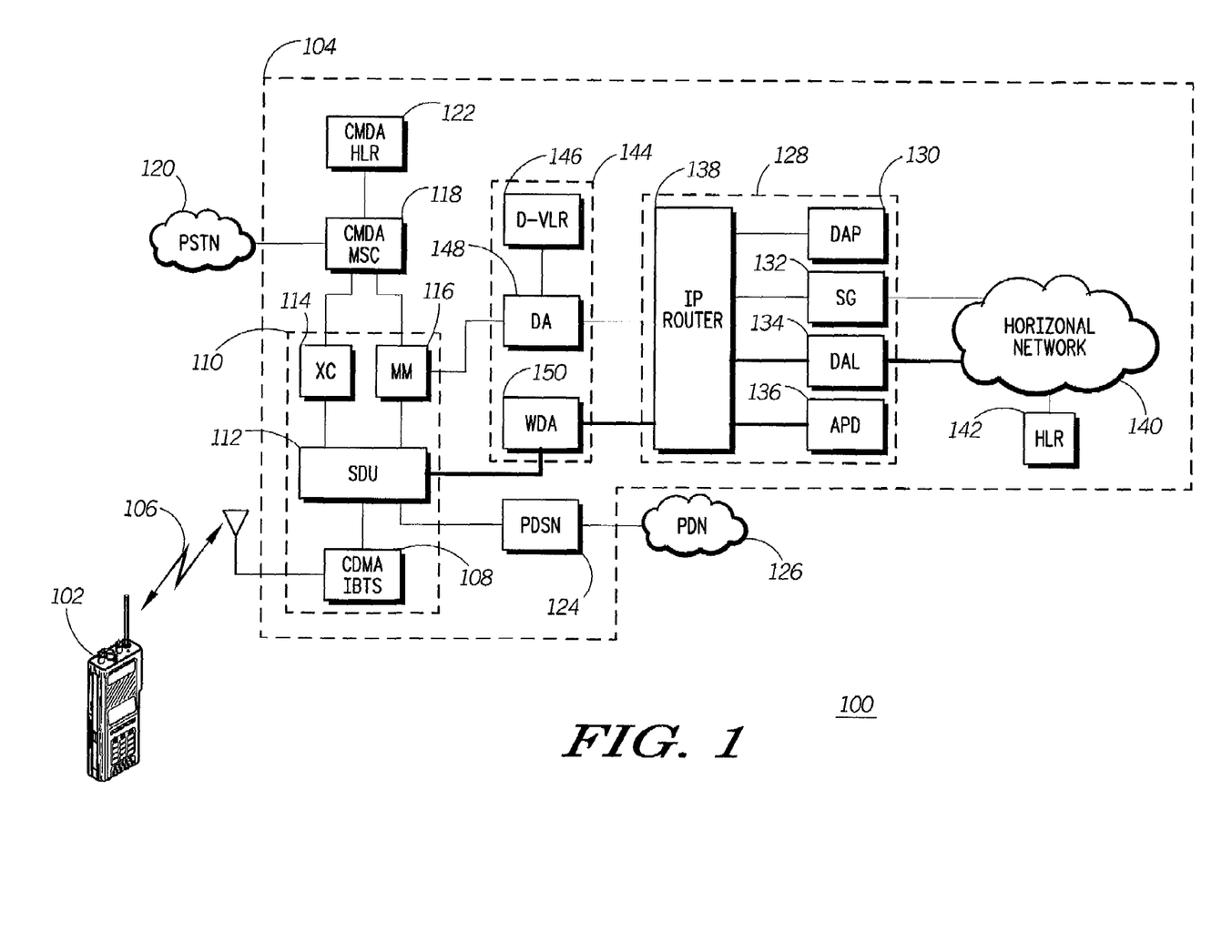
FIG. 1 shows a system diagram of a communication system in accordance with the invention.

Referring to FIG. 1, there is shown a system diagram 100 of a communication system in accordance with the invention. A mobile communication device 102 communicates with a fixed equipment network 104 over a CDMA air interface 106. The fixed equipment network comprises a plurality of base stations such as base station 108, which is a CDMA base transceiver site, or BTS. As is known, a base site establishes a serving area in the vicinity of the base site, and mobile communication devices in the serving are can access the fixed equipment network over the air interface with the base station. The base station is part of a radio access network (RAN) 110, which further comprises a selection and distribution unit (SDU) 112, transcoder (XC) 114, and a mobility manager (MM) 116. The SDU is responsible for managing link-level diversity known as Soft Handoff. The SDU routes information to other components of the fixed equipment network as shown, depending on the nature of the information, as will be described herein. The transcoder 114 converts voice information and data from the encoded form used over the air interface to standard telephony pulse code modulation (PCM) and vice-versa. The mobility manager 116 controls the access to the air interface 106, as well interpreting the signaling information received from the mobile communication device 102 as well as converting signaling from the mobile switching center (MSC) 118 to the form required by the mobile communication device. The RAN 110 is operably connected to the MSC 118, as is known in the art. The MSC switches telephone calls within the system and also to the public switched telephone network (PSTN) 120. Signaling is sent to the MSC by the MM 116, while telephony traffic is sent between the transcoder 114 and the MSC. The MSC uses a home location register 122 in a conventional manner. For data connections, such as internet access, a packet data serving node (PDSN) 124 is operably coupled to the RAN. The PDSN provides access and gateway/proxy/firewall functions between the system and a public data network (PDN) 126, such as the Internet, so that mobile communication devices can access content on the PDN and perform other activity such as email.

The dispatch calling is facilitated by a dispatch application system (DAS) 128. The DAS comprises a dispatch application processor (DAP) 130, surveillance gateway (SG) 132, dispatch access controller (DAC) 134, packet duplicator (APD) 136, and a router 138. The DAS is much like the presently used dispatch agent processors presently in use in some communications systems. The DAP 130 controls all dispatch calls, including the set up of dispatch calls, paging mobile communication devices, and so on. The SG provides the control interface to a law enforcement agency for lawful intercept of dispatch call voice traffic. The DAC routes dispatch traffic to other dispatch networks or DASs over a horizontal network or private network 140 The HLR 142 coupled to the horizontal network 140 provides a single point of contact for subscription information for a given subscriber of the service. The DAP communicates with the HLR to acquire this subscription information for use during dispatch call processing.

Between the RAN 110 and the DAS 128 is the dispatch application gateway (DAG) 144. The DAG comprises a dispatch visit location register (D-VLR) or dispatch location register 146 operably coupled to a dispatch agent (DA) 148. The DAG also comprises a wireless data agent (WDA) 150. The DA 148 acts as a protocol converter and changes CDMA messaging to DAP messaging so that the messages sent over the CDMA air interface via the MM 116 can be passed on to the DAP 130 during a dispatch call set up and during the dispatch call itself. The DA also uses the D-VLR to map dispatch paging requests to the correct CDMA location areas so that such messages can be routed to the correct location.

Figure 2:
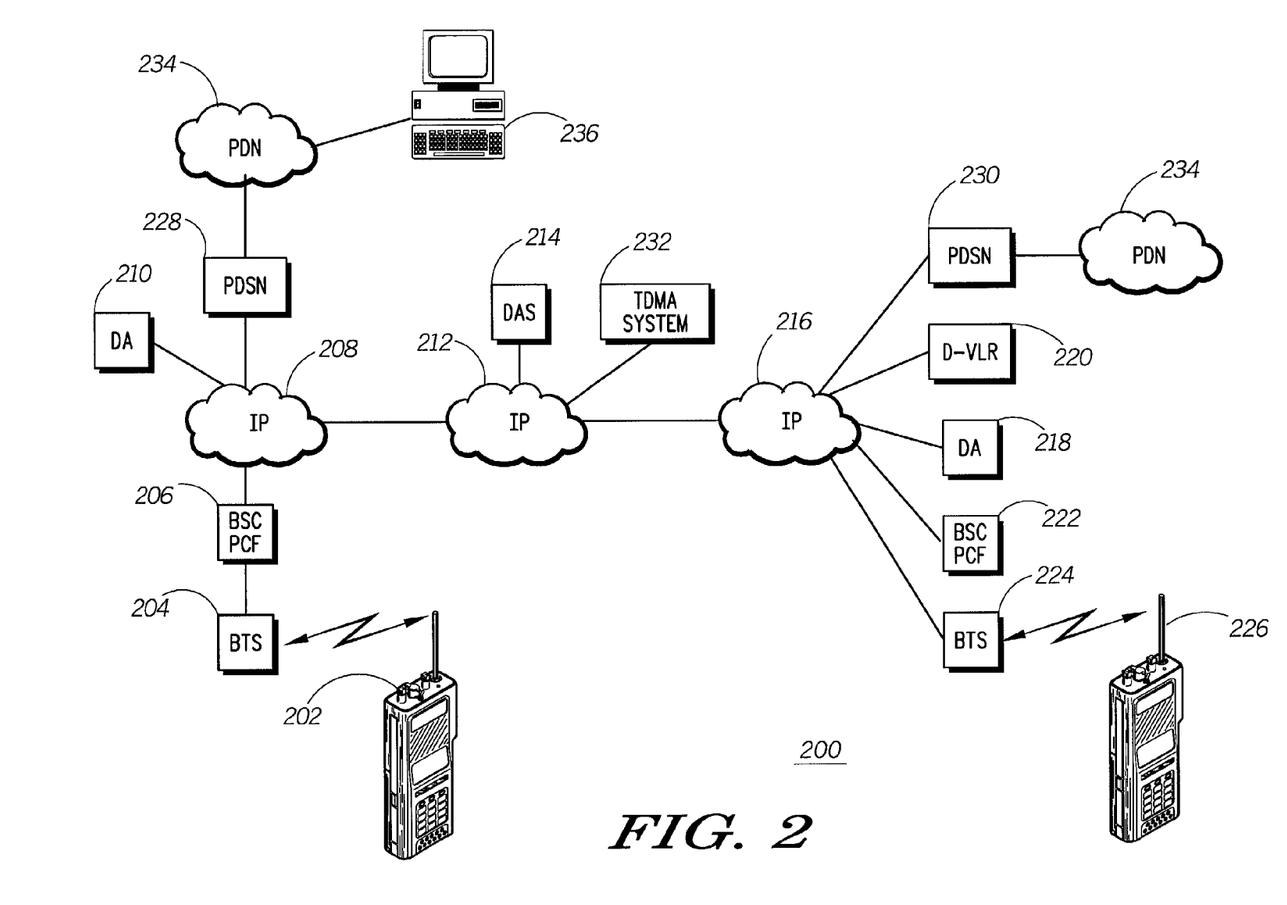
FIG. 2 shows a system diagram of a communication system in accordance with the invention, and illustrating the distributed aspect of the fixed equipment network.

Referring now to FIG. 2, there is shown a system diagram 200 of a communication system in accordance with the invention, and illustrating the distributed aspect of the fixed equipment network. The equipment shown in this figure is substantially the same as equipment shown and described in reference to FIG. 1 having the same name. Due to multiple instances of similarly named equipment, different reference numerals will be used here. The user of a CDMA mobile communication device 202 desires to make a dispatch call to a target, which could be another CDMA mobile communication device, a TDMA mobile communication device, or a computer running a virtual mobile communication device software application for example. The mobile communication device 202 is known as an originating mobile communication device 202 since it is originating the dispatch call. The originating mobile communication device begins by transmitting a dispatch call origination message from the mobile communication device to the fixed equipment network over a CDMA channel. The dispatch call origination message contains a target identifier, such as a private call identifier, for example. The first component of the fixed equipment network to receive the message is the base transceiver site (BTS) 204. The BTS sends the message up to a base site controller (BSC) 206 which detects the presence of the dispatch call request, and forwards the message over an IP network 208 to the dispatch agent (DA) 210. The DA here is the same as that shown in FIG. 1, associated with reference numeral 148. The DA routes the call request over an IP network or networks 208, 212 to the dispatch application system (LAS) 214. The DAS is the same as the DAS in FIG. 1 having reference numeral 128, and is responsible for setting up and controlling dispatch calls. The DAS then sends a page request to the appropriate dispatch agent 218 over the IP network 212, 216. It may be a different DA 218 as shown in FIG. 2, or it may be the same DA 210 that sent the request to the DAS. Upon receiving the page request, the DA 218 accesses the D-VLR 220 to determine the appropriate serving sites to which to send the page. The DA 218 then routes the page to a target BSC 222, which in turn routes it to the particular set of target BTS, such as target BTS 224, which broadcasts the page and the target mobile communication device's identifier over a broadcast control channel where it is detected by the target mobile communication device 226.

Thus far the dispatch request described could be fairly routine. However, given that the dispatch call being set up here is a CDMA to CDMA call, there are substantial differences. When the BSC initially passes the dispatch call request on to the DA 210, it immediately begins allocating communication resources for the call. Specifically, the CDMA mobile communication device is assigned to a traffic channel and messaging for facilitating that assignment is sent to the originating mobile communication device. Similarly, and concurrently, when the target mobile communication device responds to the page, the target BSC 222 begins to set up the call on the target end of the call. By using the dispatch equipment such as the DAS and the DA, and not a CDMA MSC to set up the dispatch call, the main delay in setting up the dispatch call is in call set up at the serving cells. Conventional call set up is done sequentially. According to the present invention, call set up is done concurrently at both ends of the call.

The channel that is set up over the air interface is similar to a packet data channel in that it follows a retransmission protocol. Since a dispatch call is a simplex or half-duplex call, any delay created by retransmitting voice data packets will be largely unnoticeable since only one person speaks at a time. The BSC can buffer several frames of speech before forwarding them. Furthermore, this takes advantage of discontinuous transmission (DTX) operation, when the speaker pauses or has unvoiced portions in their speech. The principle advantage to using a retransmission protocol in a radio network is an improvement in net system capacity at the expense of increased delay. This increased delay is difficult to detect due to the nature of half-duplex communication.

Once the channels are set up, and the target mobile communication device has indicated it is ready, the DAP 130 in the DAS 214 sends a message to the originating mobile communication device to start, and the call commences. The voice information travels from the originating mobile communication device to the BTS, then to the BSC. A packet control function (PCF) associated with the BSC 206 ensures packets are received and forwarded in order, essentially controlling the retransmission aspect of the radio link between the originating mobile communication device 202 and the BTS. The PCF forwards packets to the PDSN 228 which adds addressing header information so that the packets can be transmitted over a network. If the target mobile communication device is in a different region of the fixed equipment network, such as is shown with mobile communication device 226, the PDSN forwards the voice packets over the network to a second PDSN 230. The second PDSN removes the header addressing information and forwards the voice packets to the target BSC/PCF 222, where the packets are ordered, and then transmitted to the target mobile communication device 226.

In addition to another CDMA mobile communication device, the target device can be, for example, a TDMA mobile communication device, or even a personal computer connected to the internet. TDMA dispatch systems are presently in widespread use, and an operator operating a public TDMA dispatch communication system may wish to add CDMA service, and have intersystem dispatch communication. This is accomplished, according to the invention, by providing a network connection to the TDMA dispatch system 232. The TDMA system uses the same dispatch components, so it interfaces readily with the CDMA system.

In an alternative embodiment of the invention, a dispatch call is made between the originating CDMA mobile communication device 202 and a personal computer 236 connected to the internet or other public data network 234. In setting up such a call, the computer must have a virtual mobile communication device client software application running to detect and receive dispatch calls. Such software applications are presently in use for telephone calling over the internet, and modification of such for dispatch applications is a routine change. As the traffic channel for the originating mobile communication device is being set up, the DAS utilizes the PDSN 228 to set up the call path to the computer. The most common way of contacting the computer is by use of a proxy server the client application logs onto, much the way instant messaging client applications do. Setting the call path over the internet when the target is a computer is also done concurrently as the traffic channel for the originating CDMA mobile communication device is being set up.

Figure 3:
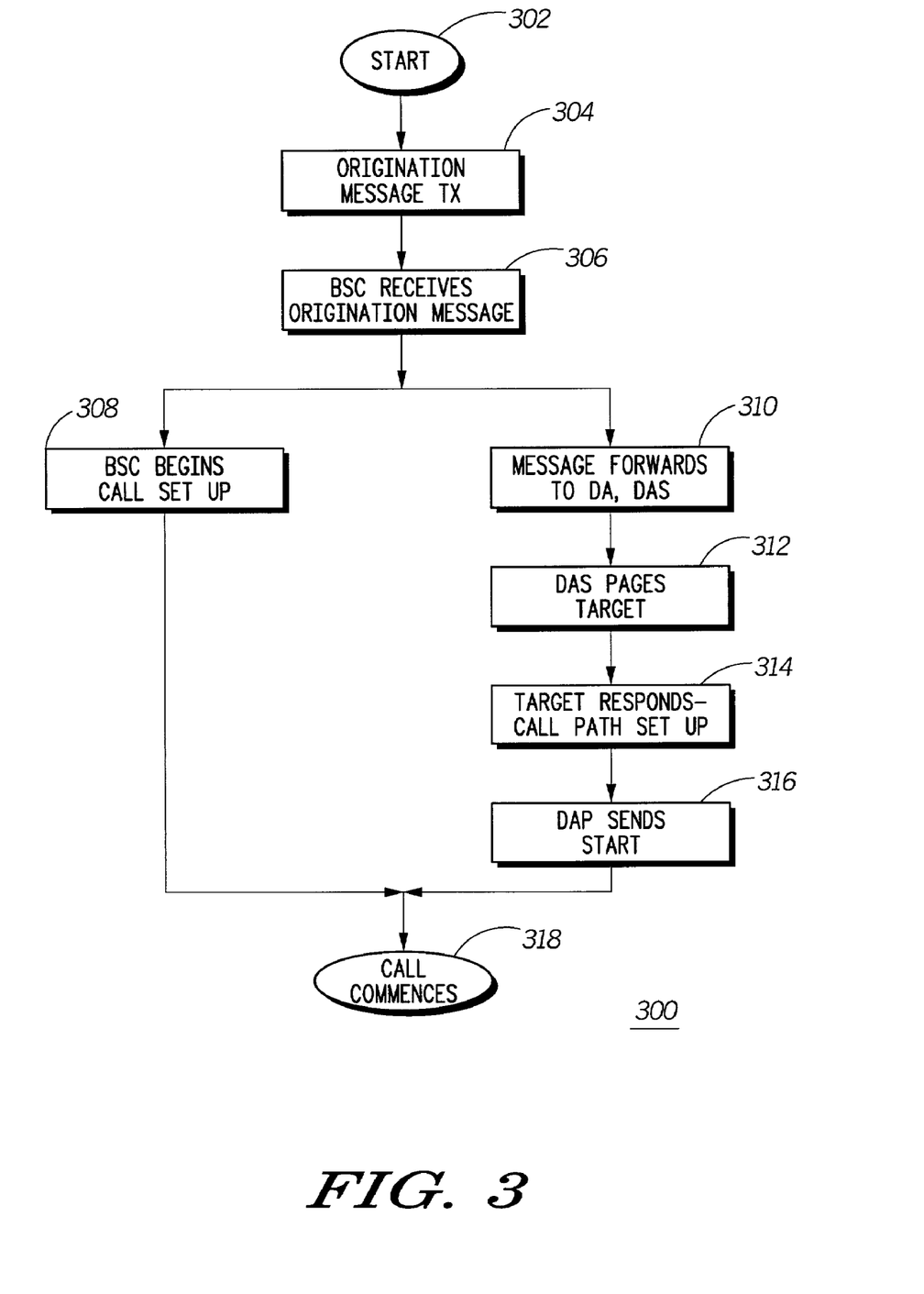
FIG. 3 shows a flow chart diagram of a method for establishing a dispatch call in a CDMA system, in accordance with the invention.

Referring now to FIG. 3, there is shown a flow chart diagram 300 of a method for establishing a dispatch call in a CDMA system, in accordance with the invention. At the start 302 the CDMA mobile communication device is registered for service and ready to make a dispatch call, meaning the user of the mobile communication device has selected a party to be called. Generally, once the party to be called has been selected, the user pushes and holds a button on the mobile communication device, known as a "push to talk" button or PTT button. However, as the call must first be set up, the user must wait for the mobile communication device to give an indication as to when to begin talking, which is not done until it receives the talk permission message from the DAP. Once the button is pushed, the mobile communication device transmits the dispatch call origination message (304). The BSC receives the message and recognizes that it is a dispatch call origination message (306). In response, two things occur concurrently. The BSC that received the dispatch call origination message begins the process of allocating and assigning the mobile communication device to a traffic channel (308). This process results in setting up a traffic channel between the mobile communication device and the fixed equipment network. While that is happening, the dispatch agent passes the message on to the DAS, and in particular the DAP component of the DAS. The DAS immediately pages the target (312). The paging can take several seconds because a dispatch agent must access a D-VLR, ascertain which cell or cells the target is located, then forward the message to those cells. In alternative embodiments, such as making a dispatch call to a computer, the DAS has to wait for the page to be forwarded over the internet, or other public data network.

Assuming the target is operational, it will receive the page and respond (314). Once the target responds, if the target is an mobile communication device, the communication resources must be allocated and assigned so that the target can be placed on a traffic channel. Once the target call path is set up, the DAP in the DAS sends a talk permission message to the originating mobile communication device (316), and the user of the originating mobile communication device can begin speaking. This process can take as long as 8–10 seconds.

To ensure that the user of the originating mobile communication device can commence speaking and the target is able to receive and play the voice signal, the originating mobile communication device waits for an alert, such as a talk permission message, to generate an event indicating to the user that the user may commence speaking, thus ensuring that the target is ready to receive the transmission. Typically the event is an audible alert, often referred to as a "beep." Upon hearing the beep, the user begins speaking. Of course, other events may be used in combination or instead of an audible alert, such as displaying an icon on a display of the mobile communication device, or flashing a light, and so on.

Some conflicts may occur in attempting to establish a dispatch call, such as the target may already be engaged in a dispatch call, or may not presently be registered for service. In a CDMA system the timing is especially important because of the more involved channel set up compared to TDMA systems. In particular power levels must be controlled so that the mobile communication device's signal doesn't interfere with any others. The present invention solves this problem in a number of ways.

Figure 4:
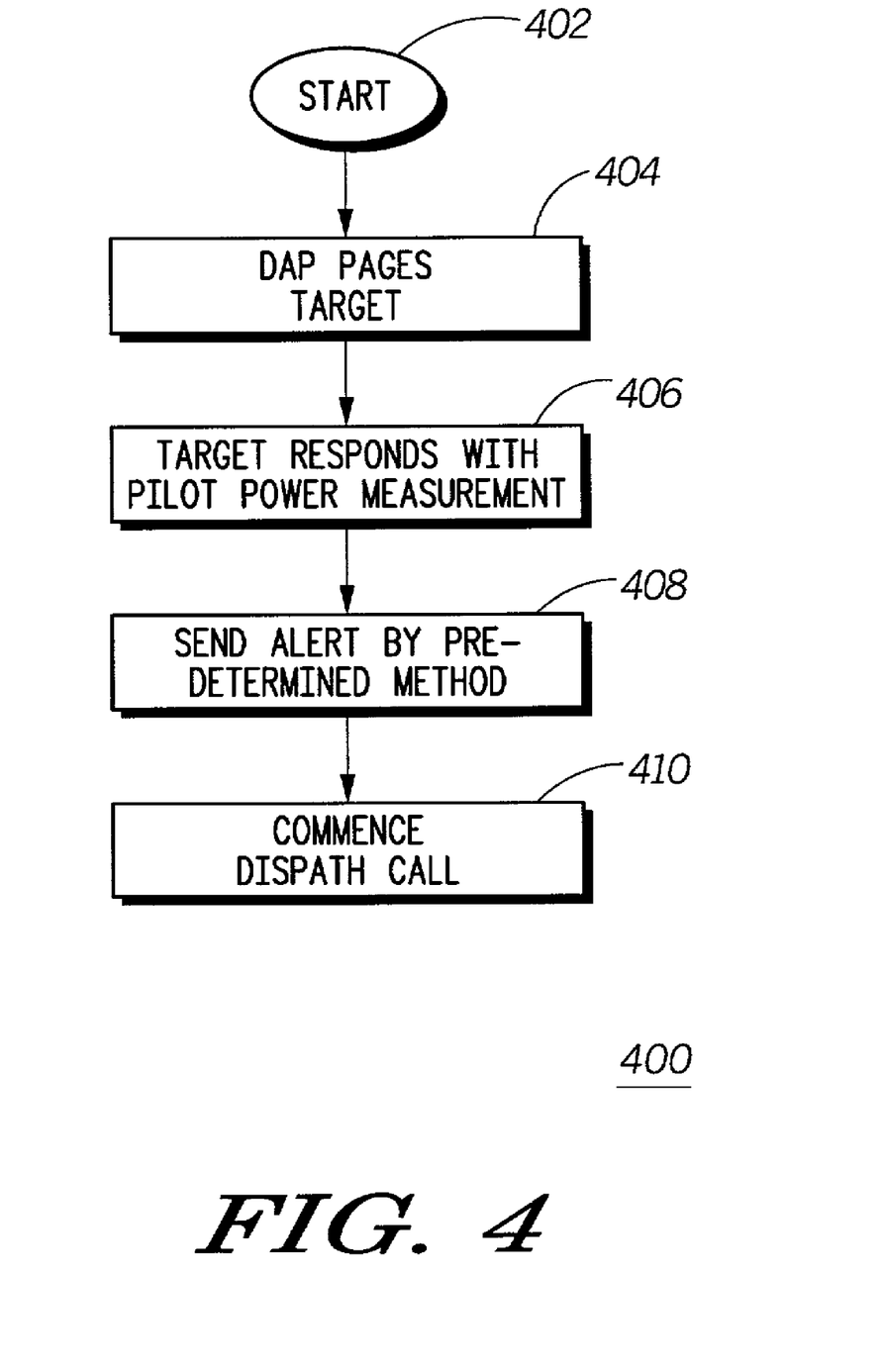
FIG. 4 shows a flow chart diagram of a method for starting a dispatch call to a CDMA mobile communication device.

Referring now to FIG. 4, there is shown a flow chart diagram 400 of a method for starting a dispatch call to a CDMA mobile communication device. At the start 402 a user of an originating mobile communication device has pressed the PTT button on the originating mobile communication device, or otherwise initiated a dispatch call. As described above, once the originating mobile communication device transmits a dispatch call origination message, the BSC serving that mobile communication device may immediately begin setting up a channel between the originating mobile communication device and the base station. At the same time the BSC is busy allocating and assigning resources, and signaling the originating mobile communication device, the DAP pages the target mobile communication device (404). If the target mobile communication device is available, it responds to the page with appropriate messaging, and includes a pilot power measurement. The pilot power measurement includes a measurement of all the pilot signals the target mobile communication device can detect from surrounding serving cells. The target mobile communication device may also alert the target user that a dispatch call is imminent by, for example, emitting an audible alert signal. If the pilot power measurement is higher than a preselected threshold, indicating sufficient dependability of the radio link, the fixed equipment can do one of several things to inform the originating mobile communication device that the target is ready. A first alternative is to queue the beep until after the traffic channel between the originating mobile communication device and the fixed equipment network has been built. A second alternative is to delay the traffic channel assignments until the beep arrives at the originating mobile communication device, and allow the user to begin speaking while the traffic channel is set up, storing the voice information in the originating mobile communication device until the traffic channel is set up. Once the traffic channel is set up, the buffered speech can be transmitted at a high rate to the target mobile communication device where it is buffered and played. This second alternative has the benefit of quickly building up the buffet at the target mobile communication device. A third alternative is to send the traffic channel assignment to the originating mobile communication device in anticipation of getting the page response from the target mobile communication device. This involves sending the traffic channel assignment message to the originating mobile communication device about 150 msecs before the beep notification is expected to arrive. In the fixed equipment if the page response comes back from the target and the target is not already busy, the fixed equipment will then proceed to send null data to the target mobile communication device. However, if the page response does not come back or the target mobile communication device is already busy in a call, the call set up will be halted.

The pilot power measurement is used by the fixed equipment to determine whether or not there is a strong likelihood that the target mobile communication device will be able to establish a reliable channel. In some cases the fixed equipment may assign the target to two different cells, which is a soft handoff state.

Thus, the invention provides a method of originating a dispatch call over a code division multiple access (CDMA) air interface from a mobile communication device, comprising transmitting a dispatch call origination message from the mobile communication device to a fixed equipment network over a CDMA channel, the dispatch call origination message containing a target identifier; then, in response to the transmitting, setting up a traffic channel between the mobile communication device and the fixed equipment network and setting up a call path between the target and the fixed equipment network. Setting up the traffic channel and setting up the call path between the target and the fixed equipment network are performed concurrently. One aspect of the invention is that the traffic channel between the mobile communication device and the fixed equipment network comprises setting up a communication link established according to a retransmission protocol to allow retransmission of data packets over the traffic channel.

Setting up the call path between the target and the fixed equipment network comprises routing the dispatch call origination message from a base site to a dispatch agent component of the fixed equipment network. The fixed equipment network goes about determining a network location of the target at the dispatch agent, and pages the target at the network location with an incoming dispatch call message. The target, whether it be another mobile communication device or a computer connected to the fixed equipment network over a public data network, responds to the incoming dispatch call message, performed by the target. Routing the dispatch call origination message from the base site to the dispatch agent component comprises routing the dispatch call origination message from the base site to a first dispatch agent or a second dispatch agent because there can be multiple dispatch agents serving various regions. The dispatch agent serving the base site of the originating mobile communication device is typically located within a mobile switching center affiliated with the base site. The second dispatch agent, since it serves a different region, is typically not located within a mobile switching center. In one embodiment, once the two mobile communication devices are established on their respective traffic channels, the fixed equipment network, and in particular the DAP, sends a talk permission message to the mobile communication devices.

The invention also provides a method of setting up a dispatch call to a target mobile communication device over a code division multiple access (CDMA) air interface. During dispatch call set up the target CDMA mobile communication device receives a page notification from the fixed equipment network, the page notification including a dispatch notification. The target CDMA mobile communication device responds by transmitting a page response, including a pilot power measurement. If the pilot power measurement indicates a power level above a preselected threshold, the fixed equipment network, and in particular the BSC serving the target mobile communication device's cell, commences settings up a traffic channel with the target CDMA mobile communication device. Typically the target CDMA mobile communication device is not engaged in a call, and is in an idle mode. At periodic intervals the mobile communication device "wakes up" and scans the pilot signal of at least one serving cell in the vicinity of the target mobile communication device, and preferably all the serving cells it can detect. The target mobile communication device commences determining a strongest pilot signal and a serving cell corresponding to the strongest pilot signal. Then the target mobile communication device commences scanning a paging channel of the serving cell corresponding to the strongest pilot signal to look for page messages. All of this activity at the target mobile communication device is performed concurrently while the fixed equipment network is setting up a call path between the originating device and the fixed equipment network. In this case the originating device may be another mobile communication device or a device from outside the wireless system, such as a computer.

Furthermore, the invention provides specifically a method of setting up a dispatch call between an originating code division multiple access (CDMA) mobile communication device and a target CDMA mobile communication device. Wen the user of an originating CDMA mobile communication device presses a dispatch talk or PTT button or equivalent, the originating CDMA mobile communication device transmits a dispatch call origination message to the fixed equipment network over a CDMA inbound control channel. The dispatch call origination message contains a target identifier corresponding to the target CDMA mobile communication device. In response, the fixed equipment network initiates the set up of a traffic channel between the originating CDMA mobile communication device and the fixed equipment network. The fixed equipment network also pages the target CDMA mobile communication device. The set up of a traffic channel and paging the target CDMA mobile communication device are performed concurrently to reduce dispatch call set up delay. The page is received by the target CDMA mobile communication device if it is available, and it transmits a page response, including a pilot power measurement. The pilot power measurement is available because the mobile communication device has already performed the measurement to determine which serving cell's paging channel to monitor. In response to transmitting the page response, the fixed equipment network transmits a talk permission message to the originating CDMA mobile communication device from the fixed equipment network. Typically transmitting the talk permission message is done by queuing the talk permission message, and sending it after the traffic channle is built, but according to an alternative embodiment the talk permission message can be sent over a broadcast control channel or a dedicated control channel to the originating CDAM mobile communication device before the traffic channel is built. The originating CDMA mobile communication device then commences alerting the user of the originating CDMA mobile communication device to begin speaking, and the mobile communication device buffets the speech until the traffic channel between the originating CDMA mobile communication device and the fixed equipment network is established. Once the traffic channel is established, the mobile communication device begins transmitting the buffered speech to the target CDMA mobile communication device over the fixed equipment network. It can transmit the speech in digital form at a high rate, so as to reduce delay, as well as provide the target mobile communication device with a buffet of speech.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of setting up a dispatch call to a target mobile communication device over a code division multiple access (CDMA) air interface, comprising:
   receiving a page notification from a fixed equipment network at the target mobile communication device, the page notification including a dispatch notification;
   transmitting a page response from the target mobile communication device to the fixed equipment network, the page response including a pilot power measurement; and
   if the pilot power measurement indicates a power level above a preselected threshold, transmitting a talk permission message to an originating CDMA mobile communication device from the fixed equipment network;
   wherein the talk permission message is transmitted to the originating CDMA mobile communication device before a traffic channel between the originating CDMA mobile communication device and the fixed equipment network is set up.

2. A method of setting up a dispatch call to a target mobile communication device as defined in claim 1, further comprising:
   prior to receiving the page notification at the target mobile communication device:
   scanning the pilot signal of at least one serving cell in the vicinity of the target mobile communication device;
   determining a strongest pilot signal and a serving cell corresponding to the strongest pilot signal; and
   scanning a paging channel of the serving cell corresponding to the strongest pilot signal.

3. A method of setting up a dispatch call to a target mobile communication device as defined in claim 1, wherein the method is performed concurrently with fixed equipment network setting up a call path between an originating device and the fixed equipment network.

4. A method of setting up a dispatch call to a target mobile communication device as defined in claim 3, wherein the setting up the call pat between an originating device and the fixed equipment network comprises setting up the call path between an originating mobile communication device and the fixed equipment network.

5. A method of setting up a dispatch call to a target mobile communication device as defined in claim 3, wherein the setting up the call path between an originating device and the fixed equipment network comprises setting up the call path between an originating CDMA mobile communication device and the fixed equipment network.

6. A method of setting up a dispatch call to a target mobile communication device as defined in claim 3, wherein the setting up the call path between an originating device and the fixed equipment network comprises setting up the call path between a computer and the fixed equipment network.

7. A method of setting up a dispatch call to a target mobile communication device as defined in claim 1, further comprising setting up a traffic channel between the target mobile communication device and the fixed equipment network according to a retransmission protocol to allow retransmission of data packets over the traffic channel.

8. A method of setting up a dispatch call between an originating code division multiple access (CDMA) mobile communication device and a target CDMA mobile communication device, comprising:
   transmitting a dispatch call origination message from the originating CDMA mobile communication device to a fixed equipment network over a CDMA channel, the dispatch call origination message containing a target identifier corresponding to the target CDMA mobile communication device;
   in response to the transmitting, initiating the set up of a traffic channel between the originating CDMA mobile communication device and the fixed equipment network;
   paging the target CDMA mobile communication device from the fixed equipment network;
   receiving a page response from the target CDMA mobile communication device at the fixed equipment network, the page response including a pilot power measurement made by the target CDMA mobile communication device; and
   in response to transmitting the page response, transmitting a talk permission message to the originating CDMA mobile communication device from the fixed equipment network if the pilot power measurement is above a preselected threshold;
   wherein the talk permission message is transmitted to the originating CDMA mobile communication device before the traffic channel between the originating CDMA mobile communication device and the fixed equipment network is set up.

9. A method of setting up a dispatch call as defined by claim 8, the method further comprising:
   alerting a user of the originating CDMA mobile communication device to begin speaking to provide speech; and
   buffering the speech in the originating CDMA mobile communication device until the traffic channel between the originating CDMA mobile communication device and the fixed equipment network is established; and
   transmitting the buffered speech to the target CDMA mobile communication device over the fixed equipment network.

10. A method of setting up a dispatch call as defined in claim 8, wherein initiating the set up of the traffic channel between the originating CDMA mobile communication device and the fixed equipment network comprises setting up a communication link according to a retransmission protocol to allow retransmission of data packets over the traffic channel.

11. A method of setting up a dispatch call as defined in claim 8, further comprising, in response to receiving the page response from the target CDMA mobile communication device, setting up a call path between the target CDMA mobile communication device and the fixed equipment network.

12. A method of setting up a dispatch call as defined in claim 11, wherein setting up the call path between the target CDMA mobile communication device and the fixed equipment network comprise:
   routing the dispatch call origination message from a base site to a dispatch agent component of the fixed equipment network;
   determining a network location of the target CDMA mobile communication device at the dispatch agent;
   paging the target CDMA mobile communication device at the network location with an incoming dispatch call message; and
   responding to the incoming dispatch call message, performed by the target CDMA mobile communication device.

13. A method of setting up a dispatch call as defined in claim 12 wherein the step of routing the dispatch call origination message from a base site to a dispatch agent component comprises the steps of routing the dispatch call origination message from a base site to one of a first dispatch agent and a second dispatch agent.

14. A method of setting up a dispatch call as defined in claim 13 wherein the first dispatch agent is located within a mobile switching center.

15. A method of setting up a dispatch call as defined in claim 13 wherein the second dispatch agent is not located within a mobile switching center.

* * * * *